United States Patent
Gaebe et al.

(10) Patent No.: US 6,218,641 B1
(45) Date of Patent: Apr. 17, 2001

(54) METHOD FOR COMPENSATING STRESS INDUCED IN AN OPTICAL COMPONENT

(75) Inventors: Carl Edward Gaebe, Fleetwood; Rudolph Conrad Schweizer, South Whitehall Township, Lehigh County; Walter Jeffrey Shakespeare, Macungie; Christopher Eugene Young, Fleetwood, all of PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/064,281

(22) Filed: Apr. 22, 1998

(51) Int. Cl.[7] .............................. B23K 26/22; G02B 6/32
(52) U.S. Cl. ......................................... 219/121.64; 385/92
(58) Field of Search .................................. 385/92, 93, 94; 372/107, 108; 219/121.63, 121.64, 121.83

(56) References Cited

U.S. PATENT DOCUMENTS

| | | |
|---|---|---|
| 4,119,363 | 10/1978 | Camlibel et al. . |
| 4,747,657 | 5/1988 | Chaoui et al. ........................... 385/92 |
| 5,074,682 * | 12/1991 | Uno et al. ................................ 385/93 |
| 5,111,522 | 5/1992 | Chaoui et al. .................... 219/121.64 |
| 5,113,404 | 5/1992 | Gaebe et al. . |
| 5,128,956 * | 7/1992 | Aoki et al. ............................. 372/108 |
| 5,216,737 * | 6/1993 | Driessen et al. ........................ 385/93 |
| 5,381,499 * | 1/1995 | Takenaka et al. ....................... 385/93 |
| 5,737,349 | 4/1998 | Gaebe .................................... 372/107 |
| 5,917,643 * | 6/1999 | Watanabe et al. ..................... 359/484 |
| 6,040,934 * | 3/2000 | Ogusu et al. ............................ 385/92 |
| 6,087,621 * | 7/2000 | Kang et al. ....................... 219/121.64 |

FOREIGN PATENT DOCUMENTS

| | | | |
|---|---|---|---|
| 3442839 * | 5/1986 | (DE) ........................................ 385/92 |
| 345874 * | 12/1989 | (EP) ......................................... 385/93 |
| 64-31106 * | 2/1989 | (JP) ......................................... 385/93 |
| 1-137204 * | 5/1989 | (JP) ......................................... 385/93 |

OTHER PUBLICATIONS

William M. Sherry et al., "High Performance Optoelectronic Packaging for 2.5 and 10 Gb/s Laser Modules," Electronic Components & Technology Conference, May 28–31, 1996.

* cited by examiner

Primary Examiner—Geoffrey S. Evans
(74) Attorney, Agent, or Firm—J. de la Rosa

(57) ABSTRACT

The present invention is a method for compensating for stress induced in optical components used to couple light egressing from the housing of optical modules employing, for example, a distributed optical isolator. It has been discovered that this induced stress may be counteracted by transmitting a balancing or compensating force so as to produce a counter-stress in the optical component. Preferably, the method uses pairs of circumferential laser welds judiciously formed a distance form the holder housing the optical component so as s to control the magnitude and direction of the applied compensating force and, hence, the counter-stress transmitted to the optical component. During welding, the effects of the induced stress are monitored and based upon any changes therein, pairs of laser welds are formed around the circumferential surface of the housing of the optical component until the induced stress is substantially reduced or eliminated.

25 Claims, 4 Drawing Sheets

METHOD FOR COMPENSATING STRESS INDUCED IN AN OPTICAL COMPONENT

TECHNICAL FIELD

The present invention relates to optical modules and, more particularly, to a method for compensating for stress induced in optical components contained within such optical modules.

BACKGROUND OF THE INVENTION

Optical modules, such as transmitters, typically house optical components hermetically in a box, such as a so-called "14-pin butterfly" housing or package. Generally, such optical modules include a laser configured to emit polarized radiation for communications purposes. Preferably, an optical isolator is disposed within or near the laser so as to suppress optical feedback caused by unwanted radiation reflected or scattered back into the laser. Optical isolators are well known in the art and typically comprise a Faraday rotator disposed between two crossed polarizers. See, for example, S. Makio et al., *Electronics and Communications in Japan*, Part 2, Vol. 74(2), p. 323 (1991).

Recently developed optical isolators, however, employ a distributed configuration so as to advantageously adjust the optical isolation performance for a given radiation wavelength. See, for example, U.S. Pat. No. 5,737,349, entitled "Optical Isolator and Alignment Method," which is commonly assigned and incorporated herein by reference. In this latter instance, the output polarizer or so-called "analyzer" is disposed within an external retainer that is welded to an opening in an end sidewall of the housing. A lens or window disposed within the opening, in part, hermetically seals the module and couples the light to the exterior of the housing. Alternatively, the analyzer is disposed within the sidewall, such as in a tube.

During assembly, the transmission axis of the output polarizer is rotated so as to maximize the optical isolation, with the polarizer then secured in place by welding the retainer to the housing. Any induced stress caused from such welding, or from any other source, however, can be transmitted to the lens or window so as to induce a birefringence. This stress-induced birefringence is typically the most dominant depolarization mechanism responsible for limiting the achievable optical isolation in such optical modules.

It would therefore be desirable to provide an optical module wherein stress induced in the optical components is substantially eliminated or reduced, particularly for optical modules employing distributed optical isolators.

SUMMARY OF THE INVENTION

The present invention relates to a method for compensating for stress induced in optical components used to couple egressing light to the exterior of the housing of an optical module employing, for example, a distributed optical isolator. It has been discovered that the induced stress may be counteracted by transmitting a balancing or compensating force or stress to the optical component. The method uses circumferential laser welds judiciously formed at a distance from the holder housing the optical component so as to control the magnitude and direction of the applied compensating force. Preferably, the effects of the induced stress are monitored during welding, and based upon any changes therein pairs of laser welds are formed around the circumferential surface of the housing of the optical component until the induced stress is substantially reduced or eliminated. Alternatively, a predetermined pattern of laser welds can be formed around the surface, which pattern has been determined empirically to reduce or eliminate the induced stress for the particular type of optical module.

In an exemplary embodiment, the inventive method is applied to a laser module comprising a housing configured to contain a laser that emits polarized radiation. The housing includes a base wall and sidewalls. An optical isolator is employed to suppress optical feedback caused by any unwanted radiation being reflected back into the laser. The optical isolator employs a distributed configuration comprising an input polarizer and a Faraday rotator, defined as a "semi-isolator." Also, the optical isolator comprises an output polarizer or "analyzer" held in an external retainer aligned radially with a tube brazed to the front wall of the housing. A lens is hermetically sealed within the front end of the tube so as to couple the light egressing from the laser to the exterior of the housing. In order to ensure that the relative position of the output polarizer remains fixed, the retainer is welded to the tube along flush points where the edges coincide.

Induced stress, such as from joining the lens to the tube, brazing the tube to the housing, or welding the retainer to the tube can be transmitted to the lens vis-a-vis a radial force transmitted along the tube, causing a stress-induced birefringence. This stress-induced birefringence may be counteracted by transmitting a balancing or compensating force or stress to the lens using laser welds formed around the tube of the optical component. In forming such laser welds, the outer portion of the tube is heated to a molten state forming a weld pool which is then allowed to cool. The weld pool, however, contracts unevenly with respect to the underlying material, transmitting along the tube a balancing force or counter-stress to the lens.

That is, the inventive method transmits a compensating or opposing force to compensate for the undesired induced stress. To do so in this latter embodiment, the magnetization field in the Faraday rotator is first reversed. With the laser turned on, the amount of light passing through the output polarizer is then measured and recorded. Next, pairs of laser welds, preferably 180° radially apart, are formed along the circumferential seam of the retainer and tube so as to apply a compensating force to the lens. Each subsequent pair of laser welds is radially offset from the last pair until the amount of power transmitted through the output polarizer no longer decreases. In this manner, the magnitude and direction of the compensating force transmitted to the lens is controlled, thereby substantially reducing the amount of or eliminating the stress-induced birefringence.

BRIEF DESCRIPTION OF THE DRAWINGS

The features and advantages of the present invention will become more readily apparent from the following detailed description of the invention in which like elements are labeled similarly and in which.

DETAILED DESCRIPTION

The present invention is directed to a method for compensating for stress induced in optical components used to couple egressing light to the exterior of the housing of an optical modules employing, for example, a distributed optical isolator. It has been discovered that the induced stress may be counteracted by transmitting a balancing or compensating force to produce an opposing stress in the optical component. Specifically, the method uses circumferential laser welds judiciously formed, preferably in pairs, a distance from the holder housing the optical component so as to control the magnitude and direction of the applied compensating force and, hence, the counter-stress induced in the optical component.

Without any loss of generality or applicability for the principles of the invention, the present inventive method is described with respect to a laser module employing a distributed optical isolator. It should be clearly understood that the present invention is equally applicable to other types of optical and photonic modules that house optical components, which likewise may develop an induced stress.

Figure 1:
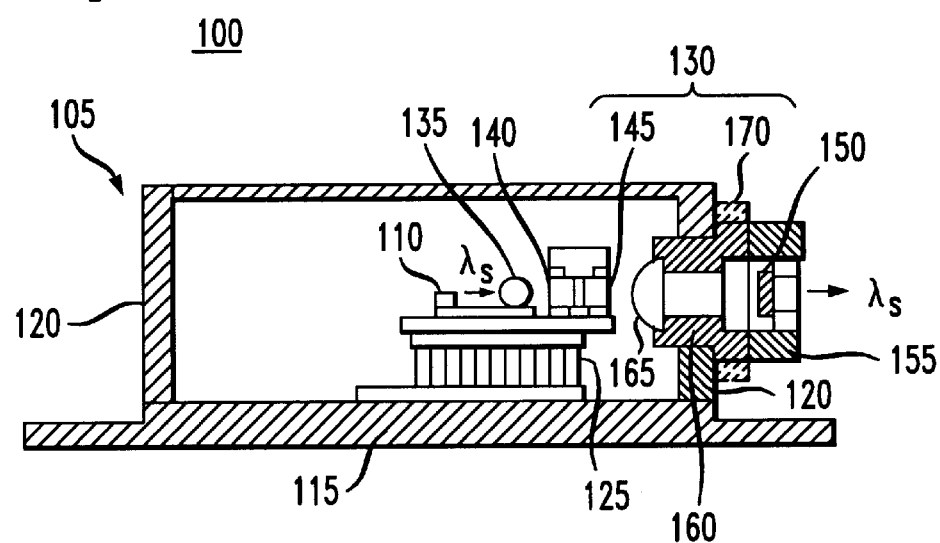
FIG. 1 depicts a cross section view along the y-z plane of a laser module formed in accordance with the principles of the invention.

Referring to FIG. 1, there is shown a laser module 100 in accordance with an exemplary embodiment of the present invention. Laser module 100 comprises a housing 105 configured to contain a laser 110 that emits polarized radiation, $\lambda_s$, along the z-axis for communications purposes. Housing 105 preferably includes: an opening along its top side for providing access to the interior thereof; a base wall 115; and sidewalls 120. Laser 110 is supported on a thermoelectric cooler (TEC) 125 configured to maintain the operating temperature of the optical components at a constant degree. In turn, TEC 125 is attached to base wall 115.

Furthermore, an optical isolator 130 is employed to suppress optical feedback caused by any unwanted radiation being reflected back into laser 110. To increase the collection efficiency of the egressing radiation into optical isolator 130, a ball lens 135 may be used to match the size of the egressing radiation to the dimensions of optical isolator 130. Optical isolator 130 preferably employs a distributed configuration comprising an input polarizer 140 and a Faraday rotator 145 (defined as a "semi-isolator") disposed on TEC 125. Also, isolator 130 comprises an output polarizer 150 or so-called "analyzer" held in a retainer 155 aligned radially with a tube 160. Retainer 155 and tube 160 have the same, or nearly the same, outer diameter. Tube 160 is brazed to sidewall 120 of housing 105. The optical axis of laser 110 is aligned with the center axis of tube 160 such that light egressing from laser 110 travels substantially along the center axes of output polarizer 150 and tube 160.

Figure 2:
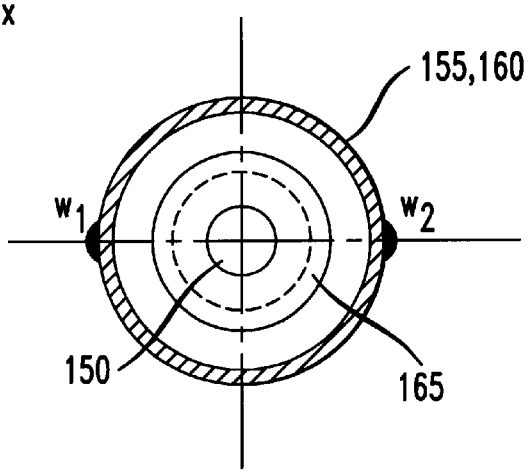
FIG. 2 depicts a cross section view along the x-y plane of a tube and retainer welded along weld points $W_1$ and $W_2$ used in the laser module of FIG. 1.

Light egressing from laser 110 passes through input polarizer 140 and is accordingly polarized along the transmission axis of polarizer 140. Upon traversing through Faraday rotator 145, the light is rotated by a predetermined angle, typically 45°. The transmission axis of output polarizer 150 is oriented so as to substantially pass light that has the same polarization as light egressing from Faraday rotator 145. In order to ensure that the relative position of output polarizer 150 remains fixed, retainer 155 is welded to tube 160, typically along flush points $W_1$ and $W_2$ lying along the horizontal axis or x-axis of the laser module, as illustrated in FIG. 2.

Unwanted reflections that propagate back through Faraday rotator 145 and output polarizer 150 are rotated and correspondingly polarized orthogonal to the transmission axis of input polarizer 140. As such, output polarizer 150 substantially extinguishes the orthogonally polarized radiation reflected back toward laser 110 and, in this manner, provides an optical isolation of about 35–45 dB.

Preferably, a lens 165 is hermetically sealed to the front end of tube 160 and used to couple the light egressing from laser 110 to an externally positioned fiber, not shown. Of course, epoxy, laser welding, or any other suitable means known in the art may be used to secure lens 165 to tube 160. In the former case, the hermetic seal is made by metallically coating the outer surface of lens 165 and soldering the metallized surface to the end of tube 160. Alternatively, however, output polarizer 150 or a flat window may be disposed at the front end of tube 160 for allowing the light to egress to the exterior of the housing.

For optical isolator 130 to function properly, the magnetization of the magneto-optics material, typically a garnet, within Faraday rotator 145 should preferably remain saturated. Accordingly, a suitable magnet surrounding the magneto-optic material may be disposed on the base wall. Preferably, however, a magnet 170 is disposed remotely or laterally from Faraday rotator 145 such that its external magnetic field maintains the desired magnetization with the magneto-optic material, as disclosed in U.S. Pat. No. 5,737,349, entitled "Optical Isolator and Alignment Method," which is commonly assigned and incorporated herein by reference. For example, magnet 170 may be formed in the shape of an annular disc or donut, and disposed around tube 160 and on sidewall 120 of housing 105.

Figure 3:
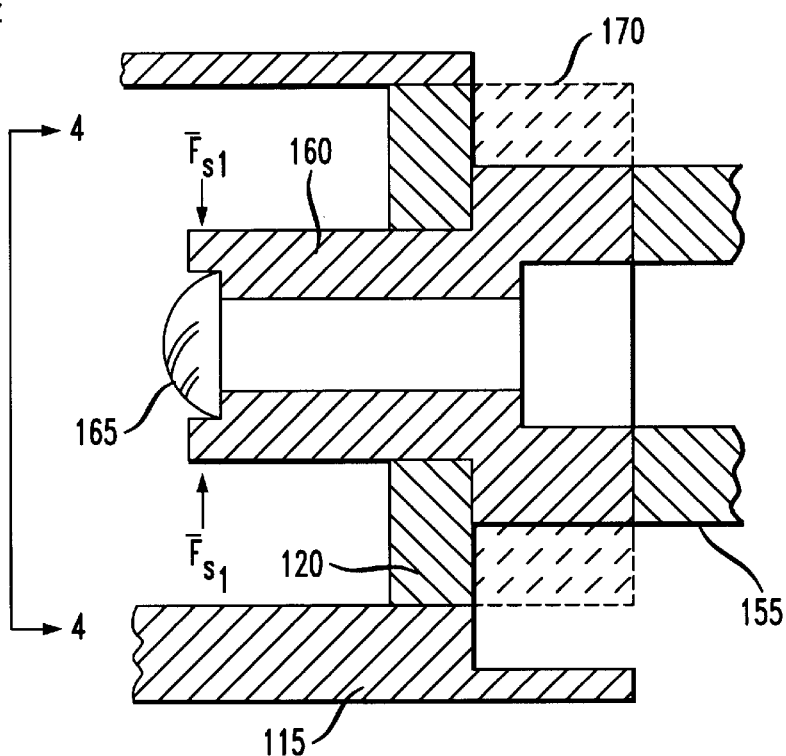
FIG. 3 depicts a radial force transmitted along the tube to a lens disposed in the laser module of FIG. 1, resulting in a stress-induced birefringence.
Figure 4:
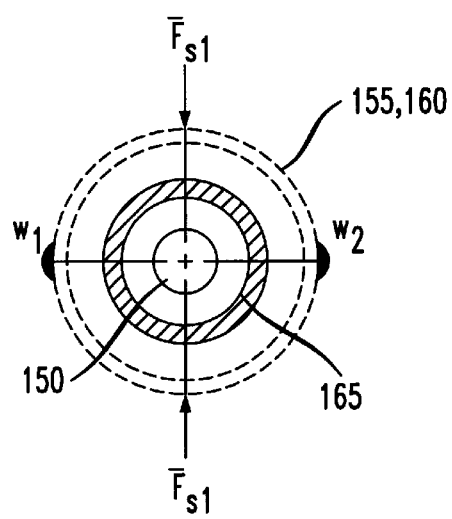
FIG. 4 depicts a front view of the tube of FIG. 3 taken along line 4–4.

Unfortunately, any undesired induced stress, such as from joining lens 165 to tube 160, brazing tube 160 to sidewall 120, welding retainer 155 to tube 160, or from any other source, can be transmitted to lens 165 vis-a-vis a radial force along tube 160, as illustrated in FIGS. 3–4. In these latter figures, the relative magnitude and direction of the indicated forces are denoted by the length and direction of the arrows. Illustratively depicted is an induced radial force, $\overline{F_{s1}}$, directed along the vertical or y-axis. This stress induces a birefringence in lens 165 in a manner well known in the art, and is typically the most dominant depolarization mechanism. This depolarization lowers the extinction ratio of the light egressing Faraday rotator 145 to about 25–30 dB, and hence the optical isolation correspondingly.

Figure 5:
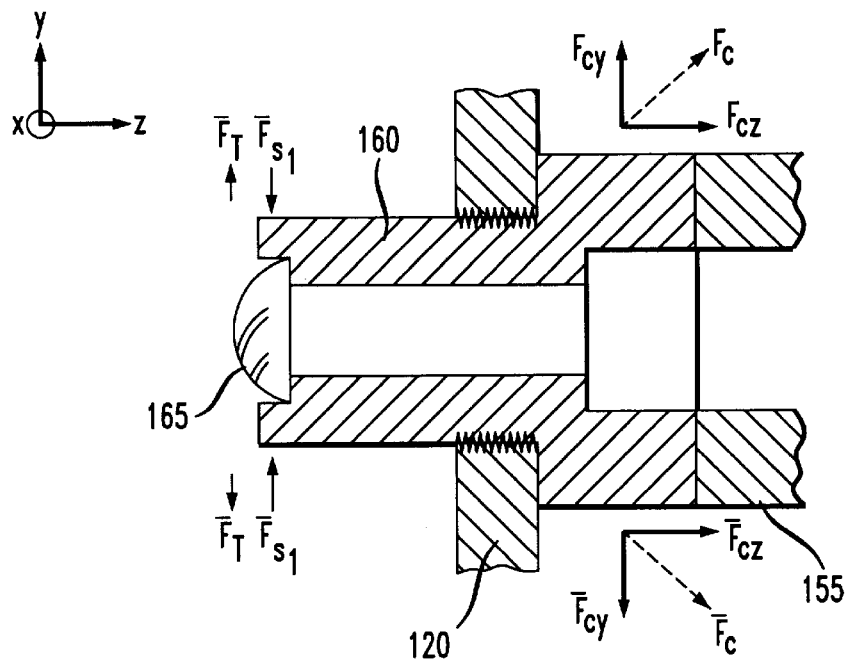
FIG. 5 depicts a generalized compensating or balancing force used to compensate for the induced stress in the optical component.

In accordance with the teachings of the present invention, it has been discovered that this induced stress and, hence, the induced birefringence may be counteracted by transmitting a balancing or compensating force or stress to lens 165. FIG. 5 illustrates an exemplary balancing force, $\overline{F_c} = \overline{F_{cy}} + \overline{F_{cz}}$, applied to an opposing end of tube 160 so as to transmit a force to lens 165 having a radial component $|F_T|$. So as to eliminate the induced stress, the radial component of the transmitted force should equal $|F_{s1}|$. Inasmuch as the forces are vector quantities, comprising both direction and magnitude, it is more accurate to impose the following condition so as to compensate for the induced stress on lens 165:

$$\overline{F_{s1}} + \overline{F_T} = 0$$

where $\overline{F_{s1}}$ and $\overline{F_T}$ are the corresponding forces expressed in vector form notation.

Since the direction and magnitude of the force $\overline{F_{s1}}$ transmitted along tube 160, however, is generally not known, an active compensating procedure has been developed for use with this laser package. The method uses circumferential laser welds judiciously formed, preferably in pairs, at a distance from the tube housing the optical component so as to control the magnitude and direction of the applied compensating force and, hence, the counter-stress induced in the optical component. It should be understood that in forming such laser welds, the outer portion of the tube is heated to a molten state forming a weld pool which is then allowed to cool. The weld pool, however, contracts unevenly with respect to the underlying material, creating forces $\overline{F_{cy}}$ and $\overline{F_{cz}}$. In turn, the resultant force $\overline{F_c}$ is transmitted along the tube and develops a balancing force or counter-stress having a radial component $\overline{F_T}$ that is applied to lens 165.

During welding, the optical power egressing from output polarizer 150 is monitored while the magnetization field in Faraday rotator 145 is revered. Based upon any changes in this output, pairs of laser welds are judiciously formed, for example, 180° radially apart along the circumferential seam of retainer 155 and tube 160, so as to apply a compensating opposing force or stress to the lens. Each subsequent pair of laser welds is radially offset from the last pair so as to control the magnitude and direction of the compensating force transmitted to lens 165.

Figure 6:
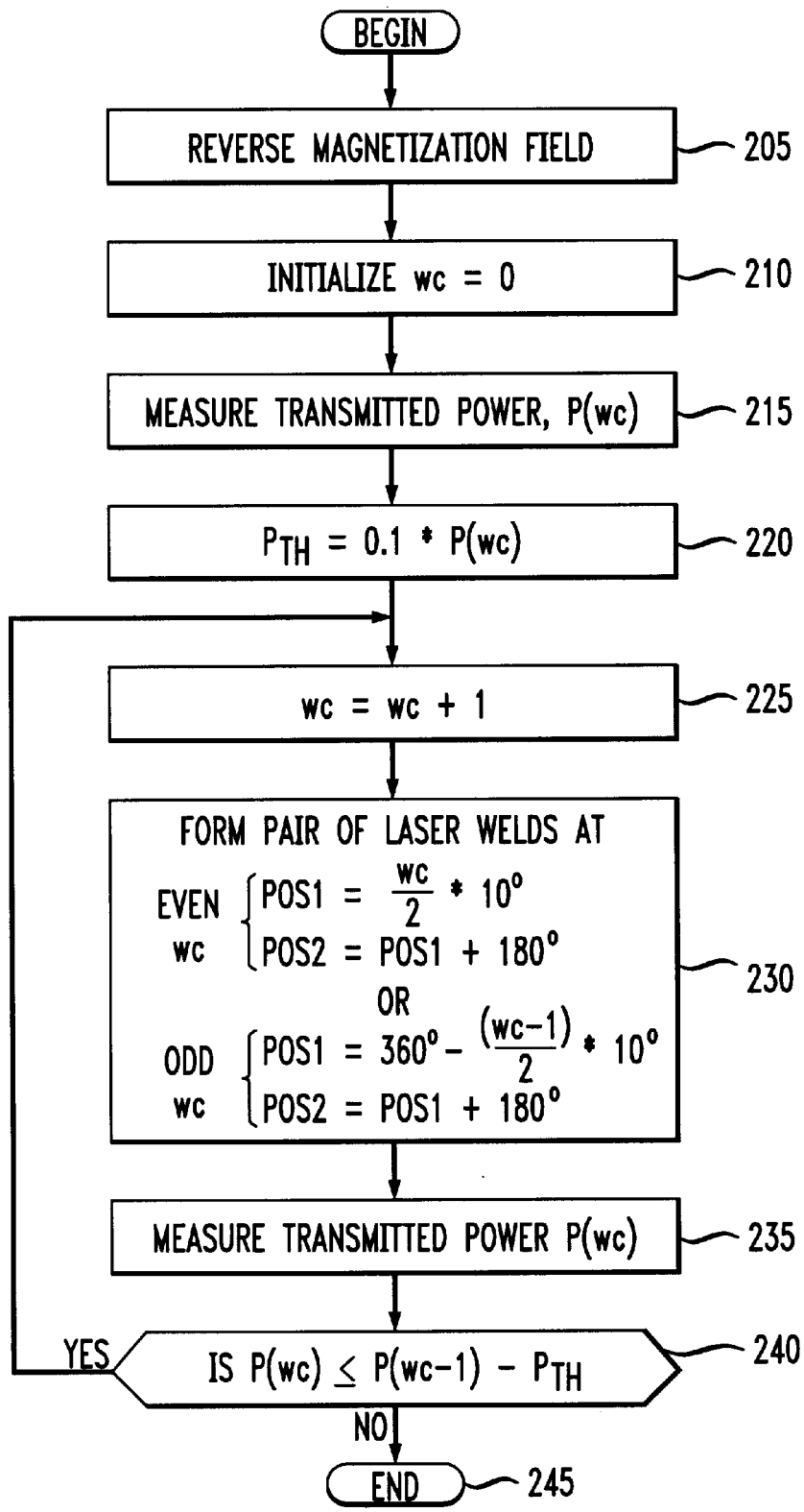
FIG. 6 depicts an illustrative flow chart detailing a procedure for applying pairs of laser welds to compensate for the stress-induced birefringence in accordance with the principles of the present invention.

In accordance with principles of the invention, shown in FIG. 6 is a flowchart which illustrates an exemplary algorithm for compensating for the stress-induced birefringence, which may be basis for automating this operation. As shown, the process begins at step 205 with the magnetization field in Faraday rotator 145 being initially reversed. This may be effected by removing magnet 170 and reversibly inserting it back such that its magnetic poles are reversed. This reversal causes the rotation of the polarized light traversing through Faraday rotator 145 to be correspondingly reversed. In the absence of any stress-induced birefringence, output polarizer 150 should extinguish the light traversing through Faraday rotator 145 inasmuch as the output polarizer is tuned for extinction in the forward direction.

At step 210, weld counter, WC, associated with the number of weld pairs formed along the seam is initialized to a value of zero (0). With laser 110 turned on, the amount of light passing through output polarizer 150 is measured and recorded as P(WC)=P(0) at step 215. A portion of this power referred to as threshold value $P_{th}$ is determined by the relation, $P_{th}=0.01*P(0)$ at step 220. The purpose of this threshold value will be discussed later in association with a subsequent step in this procedure.

Proceeding along the flowchart, the weld counter WC is incremented to one (1) at step 225. A first pair of laser welds is formed at seam points $W_0$ and $W_{180}$ at radial positions POS1=0° and POS2=180°, respectively, along the circumferential seam at step 230. Alternatively, the laser welds may be applied adjacent or near the seam for effecting the same or substantially the same results. Also, the first pair of welds may have been formed along the y-axis (POS1=90° and POS2=270°).

Next, the transmitted power is recorded at step 235 as P(1). At decision step 240, the recorded transmitted power P(1) is compared with the quantity P(0)−$P_{th}$. The threshold value $P_{th}$ is subtracted from P(0) to compensate for nominal fluctuations in the laser output. In this example, the threshold value is 1% of the initial transmitted power, but other threshold values may be used.

Returning to decision step 240, if the transmitted power P(1) is less than P(0)−$P_{th}$, then the welding process continues and additional pairs of welds are formed symmetrically with respect to the y-axis along the circumferential seam in 10° increments until the transmitted power no longer decreases, as discussed herein below. That is the welding process loops back to step 225 and increments the weld counter WC, and continues to form pairs of welds symmetric with respect to the y-axis. Each pair consists of welds 180° radially apart. Once the transmitted power no longer decreases, the process terminates at step 245.

More specifically, assuming that the value of P(1) is less than the previous one, then the weld counter WC is incremented to two (2) at step 225. Then, a second pair of welds $W_{10}$ and $W_{190}$ is formed at radial positions POS1=10° and POS2=190° along the seam at step 230, and again the transmitted power recorded, but as P(2) at step 235. Similarly, the transmitted power P(2) is compared to the previously recorded value less the threshold value, P(1)−$P_{th}$. If the value P(2) is less, likewise the process loops to step 225 and increments the weld counter WC to three (3). A third pair of laser welds $W_{350}$ and $W_{170}$ is formed at radial positions POS1=350° and POS2=170°, respectively, along the seam. The transmitted power is recorded now as P(3) at step 235. As noted above, the second and third pairs of welds are symmetric with respect to the y-axis. This process repeats so on, until the measured transmitted power no longer decreases by a predetermined amount.

Now referring specifically to step 235, the radial positions of the pairs of the laser welds are determined by the following relationship so as to produce pairs of welds symmetric with respect to the y-axis and offset radially by 10°:

$$POS1 = \frac{WC}{2} * 10°$$

$$POS2 = POS1 + 180°$$

for even number values of WC $$POS1 = 360° - \frac{(WC-1)}{2} * 10°$$

$$POS2 = POS1 - 180°$$

for odd number values of WC

Figure 7:
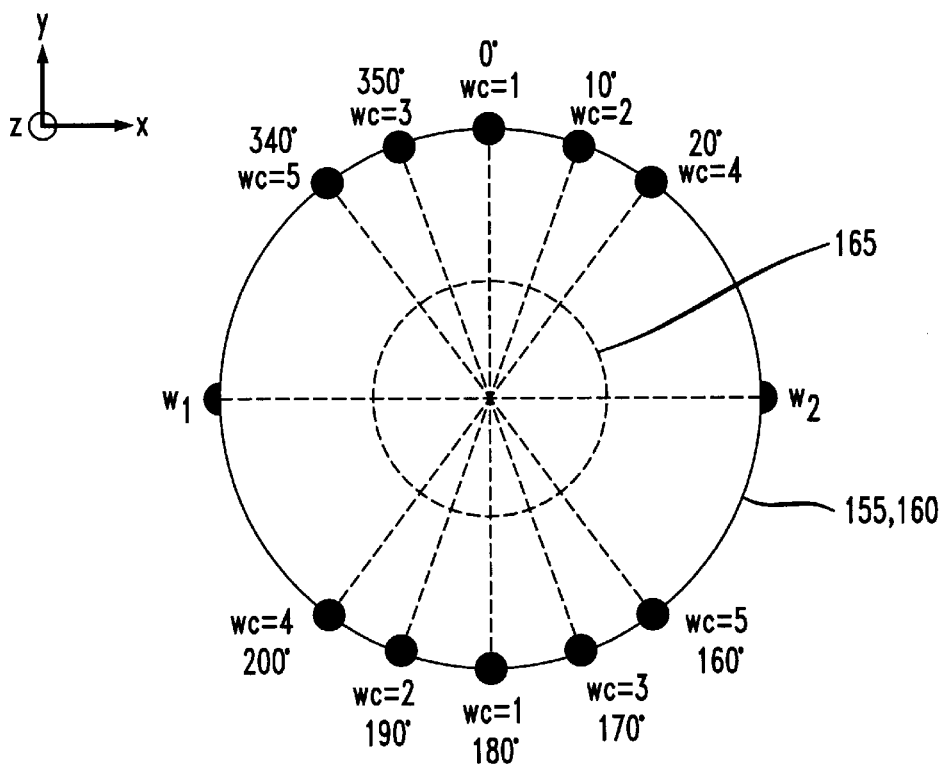
FIG. 7 depicts illustrative pairs of laser welds formed along the seam of the tube and retainer used in the laser module of FIG. 1.

Below is a chart of the radial positions of the pairs of the laser welds in accordance with the above relationship. The left hand column denotes the weld count WC and the next two columns the radial positions POS1 and POS2 of the laser welds measured in degrees. Ten such illustrative pairs of laser welds (WC=1–5) radially positioned in 10 degree increments are shown in FIG. 7 to show more clearly how the pairs of the laser welds are positioned symmetrically with respect to the y-axis.

| WC | POS1 (Degrees) | POS2 (Degrees) |
|---|---|---|
| 1 | 0 (360) | 180 |
| 2 | 10 | 190 |
| 3 | 350 | 170 |
| 4 | 20 | 200 |
| 5 | 340 | 160 |
| 6 | 30 | 210 |
| 7 | 330 | 150 |

-continued

| WC | POS1 (Degrees) | POS2 (Degrees) |
|----|----------------|----------------|
| 8  | 40  | 220 |
| 9  | 320 | 140 |
| 10 | 50  | 230 |
| 11 | 310 | 130 |
| 12 | 60  | 240 |
| 13 | 300 | 120 |
| 14 | 70  | 250 |
| 15 | 290 | 110 |
| 16 | 80  | 260 |
| 17 | 280 | 100 |

Furthermore, it is also contemplated that Faraday rotator 145 may be made of a special material known as a "latching garnet" which utilizes the Faraday effect of rare earth iron garnets, such as $(Bi_xTb_{1-x})_3(Fe_yGa_{1-y})_5O_{12}$. See, for example, U.S. Pat. No. 5,608,570 which is incorporated herein by reference. Such rare earth iron garnets have a low saturation magnetization. Accordingly, permanent magnets are not needed to maintain the so-called "latching Faraday rotator" in its saturated state. In order to reverse the magnetization field of the latching Faraday rotator at step 205 of the above procedure, a magnetic field is temporarily applied to the latching garnet to reverse its magnetization domain. Pairs of laser welds are then formed to compensate for the stress-induced birefringence in lens 165, as discussed herein above. Thereafter, a second magnetic field in the reverse direction is temporarily applied to the latching garnet to reverse its magnetization domain back to its original alignment.

It should be clearly understood that in the above procedure, pairs of laser welds are formed symmetrically with respect to the y-axis along the circumferential seam of retainer 155 and tube 160 so as to control the magnitude and direction of the compensating force transmitted to lens 165. In this manner, the stress-induced birefringence in lens 165 is compensated. However, it should be clearly understood that each laser weld may be formed individually along the seam in radial increments as the transmitted power through the output polarizer is monitored.

Furthermore, for a particular type of optical module, the laser weld pattern required to compensate for the stress induced in the lens may be readily determined empirically. For example, the laser weld pattern of FIG. 7 may be determined empirically to substantially reduce the stress-induced birefringence in lens 165 for a particular type of optical module. As such, subsequent optical modules of the same type may then employ the same laser weld pattern to compensate for the induced stress without the need to actively monitor the amount of the power transmitted through output polarizer 150.

Thus, variations in the inventive process may be made which will still embody the principles of the invention and fall within the spirit and the scope thereof. These and other modifications would have no substantial effect on the overall principles of the invention relating to applying a counterforce to compensate for the stress induced in the optical component serving as the exiting port for the radiation egressing the optical module. Also, it should be clearly understood that output polarizer 150 may instead be disposed at the front end of tube 160 rather than lens 165, or anywhere along the traveling direction of the light egressing from the laser, without affecting the process. Additionally, the pairs of the laser welds may be radially offset in increments of 5°, or any other value.

What is claimed is:

1. A method for compensating for the existing stress induced in an optical component housed in a holder which is secured to a wall of an optical module, the method comprising the steps of:
   (a) measuring the initial effect of the existing stress induced in the optical component;
   (b) applying a compensating force along the circumferential surface of the holder and at a distance from where the holder is secured to the wall of the optical module for transmitting a radial component of the compensating force to the optical component so as to counteract the existing stress induced in the optical component;
   (c) measuring and recording the current effect of the existing stress induced in the optical component; and
   (d) applying compensating forces each positioned radially offset from the last compensating force if the current effect of the induced stress is less than the last recorded value by a predetermined amount.

2. The method according to claim 1 wherein said compensating forces are applied in pairs 180° radially apart.

3. The method according to claim 1 wherein said step of applying compensating forces includes the step of forming welds along the circumferential surface of the holder.

4. The method according to claim 3 wherein said welds are laser welds.

5. The method according to claim 1 wherein said compensating forces are applied symmetrically with respect to a y-axis of the optical module.

6. The method according to claim 1 wherein said holder is a tube.

7. The method according to claim 1 wherein the existing stress induced in the optical component cause an induced birefringence in the optical component.

8. The method according to claim 1 wherein said optical module includes an optical isolator comprising a Faraday rotator disposed between input and output polarizers, said optical component disposed between the Faraday rotator and said output polarizer.

9. The method according to claim 1 wherein said optical component is hermetically sealed to said holder, said optical component providing an optical path to the exterior of said optical module.

10. A method for compensating for the existing stress induced in an optical component interposed between an analyzer and a semi-isolator consisting of a polarizer and a Faraday rotator, said optical component housed in a tube secured to a sidewall of the optical module and attached to a retainer holding said analyzer, said method comprising the steps of:
   transmitting light from a laser through said semi-isolator, said optical component and said polarizer;
   reversing the magnetization field in said Faraday rotator;
   measuring the amount of light transmitted through said analyzer, said transmitted light indicative of the existing induced stress on the optical component; and
   laser welding along the seam of said tube and retainer at predetermined weld points so long as the amount of light transmitted through said analyzer decreases by a predetermined amount, wherein said laser welding produces a compensating force transmitted to said optical component so as to induce a counter-stress therein.

11. The method according to claim 10 wherein weld points are located 180° radially apart.

12. The method according to claim 10 wherein said Faraday rotator includes a latching garnet.

13. The method according to claim 10 wherein said optical component is a lens.

14. The method according to claim 10 wherein said tube and retainer have substantially the same outer diameter.

15. The method according to claim 10 wherein said weld points are symmetrically positioned along the circumferential surface of the seam of said tube and retainer.

16. A method for compensating stress-induced birefringence in an optical component located between an analyzer and a semi-isolator consisting of a polarizer and a Faraday rotator, said optical component housed in a tube joined to a sidewall of the optical module and attached to a retainer holding said analyzer, said method comprising the steps of:

(a) transmitting light from a laser through said semi-isolator, said optical component and said output polarizer (b) reversing the magnetization field in said Faraday rotator;

(c) measuring the initial amount of light transmitted through said analyzer, said transmitted light indicative of the stress induced birefringence in the optical component;

(d) laser welding said tube and retainer at weld point pairs positioned radially at POS1 and POS2 given by $$POS1 = \frac{WC}{2} * \theta \quad \text{for even number values of } WC$$
$$POS2 = POS1 + 180°$$

$$POS1 = 360° - \frac{(WC-1)}{2} * \theta° \quad \text{for odd number values of } WC$$
$$POS2 = POS1 - 180°$$

wherein WC is the pair number of the laser weld points, and θ is a predetermined radial offset;

(e) measuring and recording the current amount of light transmitted through the output polarizer; and (f) incrementing the value of WC and looping to step (d) if the current amount of transmitted light is less than the last recorded valued by a predetermined amount.

17. The method according to claim 16 wherein said optical component is a lens.

18. The method according to claim 16 wherein θ is 10°.

19. The method according to claim 16 wherein said Faraday rotator includes a latching garnet.

20. An optical module including:

a housing having at least one sidewall;

a holder secured to said at least one sidewall for housing an optical component providing an optical path to the exterior of said optical module; and laser welds formed along the circumferential surface of said holder and in a predetermined pattern for transmitting a compensating force to the optical component so as to substantially reduce the existing stress induced in said optical component.

21. The optical module of claim 20 wherein said optical component is a lens.

22. The optical module of claim 20 wherein said optical component is hermetically sealed to said holder.

23. The optical module of claim 20 further comprising an optical isolator including a Faraday rotator disposed between input and output polarizers, said optical component disposed between said Faraday rotator and said output polarizer.

24. The optical module of claim 23 further comprising a retainer radially aligned with said holder, said output polarizer disposed within said retainer.

25. The optical module of claim 23 wherein said laser welds are formed along the seam of said holder and said retainer.

* * * * *